United States Patent

Sung

[11] Patent Number: 6,010,250
[45] Date of Patent: Jan. 4, 2000

[54] PLUG FOR FIBRE OPTIC CABLE

[76] Inventor: Allen L. Sung, 5 Concorde Place, Suite 3003, Don Mills, Ontario, Canada, M3C 3M8

[21] Appl. No.: 09/112,295

[22] Filed: Jul. 9, 1998

[51] Int. Cl.[7] ....................................................... G02B 6/36
[52] U.S. Cl. .................................. 385/78; 385/76; 385/72
[58] Field of Search .................................. 385/78, 76, 56, 385/60, 72, 75

[56] References Cited

U.S. PATENT DOCUMENTS 4,834,487   5/1989   Abendschein et al. ................... 385/86

*Primary Examiner*—Phan T. H. Palmer
*Attorney, Agent, or Firm*—Jane Parsons

[57] ABSTRACT

A connector for optic fibres includes mechanism to bias the optic fiber forwardly so that a firm "light tight" connection is possible. A rigid end portion of an optic fiber cable extends slidably forward through a plug and is biased forwardly by a helical spring. The spring acts between a bearing of a housing an a bearing on the rigid end portion of the cable. The housing and the plug are connected firmly together by means of snap fastening between them.

8 Claims, 2 Drawing Sheets

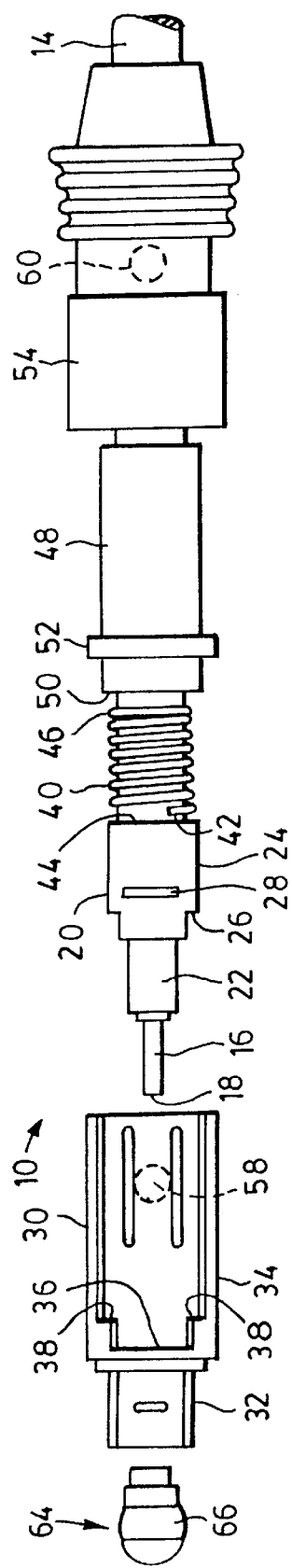
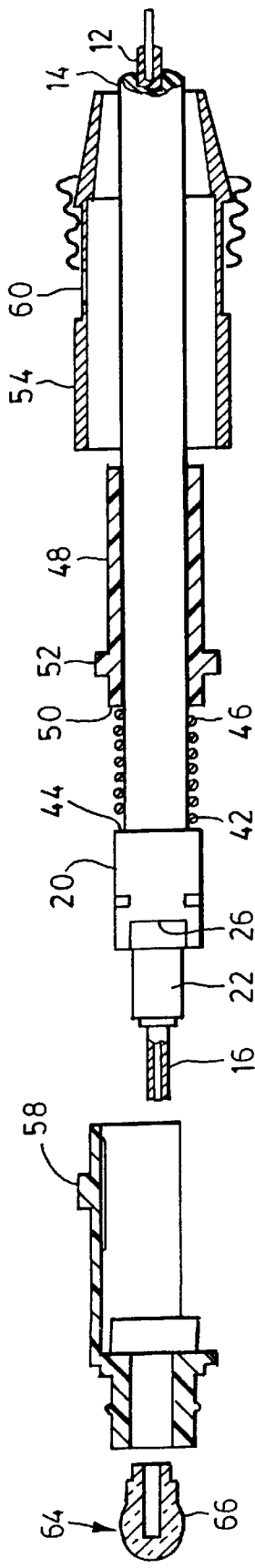

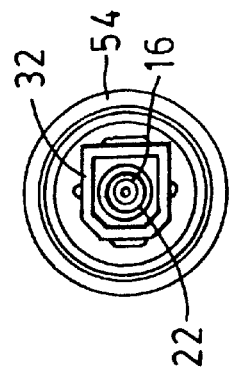
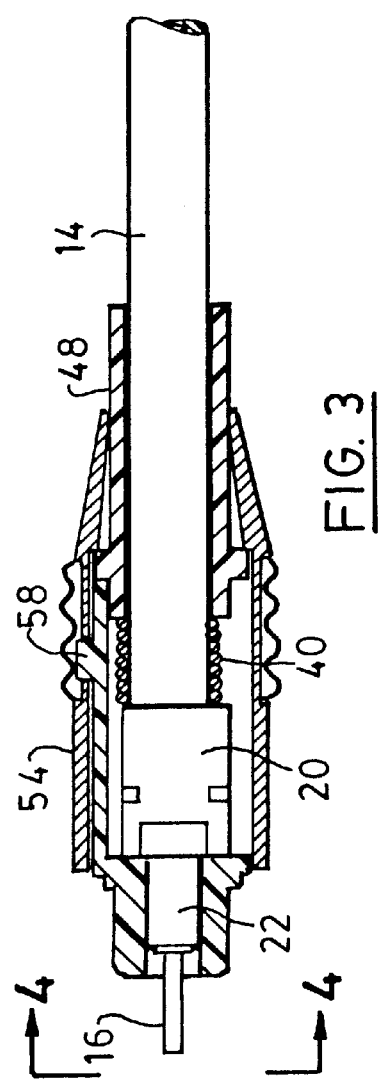
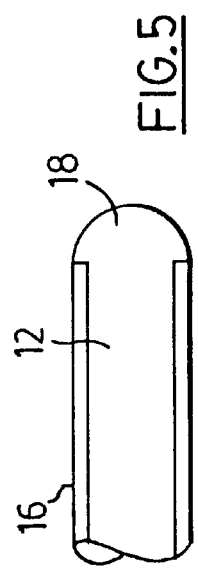

PLUG FOR FIBRE OPTIC CABLE

BACKGROUND OF THE INVENTION

1. Field of the Invention

This invention relates to connectors for optic fibre cables.

2. Acknowledgement of Prior Art

Optic fibre cable is becoming more and more important in the transmission of data over distance but optic fibre cables present special problems in connecting one cable to another or to an appliance for receiving or transmitting light. Particular problems that arise are the proper alignment of the fibres and the attainment of a tight fit in the connection. When any plug is connected into a socket it is rarely a completely tight fit at its leading face with the adjacent surface of the socket. For most plugs this is not important since connection is through the circumference of the respective plug and socket. For fibre optic cables however, connection is through the flush faces of the optic fibres. If one face does not make perfect connection with the adjacent face of a complementary member light is lost and quality of transmission is affected. It is therefore extremely important that, for fibre optic cables an optimized tight fit of the face at the end of the cable is desirable. Various attempts have been made to provide such an optimized fit and some of these are set out in:

| U.S. Pat. No. 5,717,802 | Briggs et al. | Feb. 10, 1998 |
| U.S. Pat. No. 5,444,806 | deMarchi et al. | Aug. 22, 1995 |
| U.S. Pat. No. 5,097,525 | Garcia et al. | Mar. 22, 1992 |
| U.S. Pat. No. 4,834,487 | Abendschein et al. | May 30, 1989 |
| U.S. Pat. No. 4,793,683 | Cannon, Jr. et al. | Dec. 27, 1988 |
| U.S. Pat. No. 4,193,663 | Timmermann | Mar. 18, 1980 |
| U.S. Pat. No. 5,414,790 | Lee et al. | May 9, 1995 |
| U.S. Pat. No. 5,594,825 | Kawasaki et al. | Jan. 14, 1997 |
| U.S. Pat. No. 5,542,015 | Hultermans | July 30, 1996 |
| U.S. Pat. No. 5,230,032 | Muzslay | July 20, 1993 |
| U.S. Pat. No. 5,212,752 | Stephenson et al. | May 18, 1993 |
| U.S. Pat. No. 5,170,452 | Ott | Dec. 8, 1992 |
| U.S. Pat. No. 4,798,431 | Clark et al. | Jan. 17, 1989 |
| U.S. Pat. No. 4,812,007 | Lukas | Mar. 14, 1989 |

These patents are exemplary of the large number of fibre optic cable connectors which have been provided. Of these patents some of them, for example U.S. Pat. No. 4,834,487, show optic fibre cable plugs in which the plug itself is pressed forwardly by a spring so that the plug is biased into the socket. This is not a wholly satisfactory solution to the problem since the end of the fibre optic cable itself may become worn or may not project far enough from the plug to make a perfect fit with its mating member. It would be preferable to bias the fibre optic cable itself within the plug so that when the plug is seated firmly in the socket the fibre optic cable is biased to project from it towards its mating member. Such a situation is described in U.S. Pat. No. 5,717,802 to Briggs et al. U.S. Pat. No. 5,717,802 shows a spring biased fibre optic cable projecting from a plug body. A bearing for the spring is provided by shoulders of cantilevered members of the plug body. The cantilevered members, are snapped into position and are held in that position by means of a shoulder formed in the casing of the optic fibre cable.

SUMMARY OF THE INVENTION

It would clearly be desirable to provide a connector which is inexpensive, not unduly subject to wear and stress, and easily connectible to an end of an optic fibre and its casing without the need for the provision of machining at a precise distance from the end of each cable.

Thus according to the invention there is provided a fibre optic plug connector comprising an optic fibre cable having a flexible protective casing along its length and a rigid jacket about the circumference of an end portion, an unobstructed end face of the fibre being for connection to a complementary member; a collar about the fibre optic cable at a transition between said protective casing and said rigid jacket, the rigid jacket projecting forwardly out of the collar; a plug sleeve to receive the collar therein having an axial passage therethrough and having forward and rearward sections, the forward section being formed as a plug to fit a complementary socket of the complementary member, the sleeve having an internal shoulder shaped to engage a forward end of the collar in non-rotational relationship such that said rigid jacket projects forwardly from the plug sleeve; a helical spring freely about said protective casing rearwardly of the collar and axially aligned within said rearward section of the plug sleeve; a support sleeve about said protective casing rearwardly of said spring, said support sleeve having a radially outwardly projecting shoulder about a forward end portion thereof; and a housing sleeve having a forward open end portion, the housing sleeve covering the rearward section of the plug sleeve and the forward end portion of the support sleeve, snap fastening means being provided between the housing sleeve and the plug sleeve to fasten them together such that the spring is compressed between the collar and the support sleeve to bias the optic fibre forwardly.

Conveniently, the plug sleeve may be formed of plastic material having some resilience and may have an elongate portion of its rearward section cut away for visibility in original assembly of the connector, i.e. it may comprise only a section of cylindrical sleeve. Some material costs may be saved by such cut-away portion and the cut away may provide additional resilience.

The snap fastening means between the housing sleeve and the plug sleeve may conveniently comprise a lug on one of the members to cooperate with a slot or aperture in the other of the members to hold them firmly together with the spring in compression. Conveniently the lug may project from the rear section of the plug sleeve into a complementary aperture on the sleeve housing. The rear section of the plug sleeve may have sufficient resilience so that, in assembly, the housing sleeve may be telescoped forwardly over the rear section of the plug sleeve until the lug of the aperture match and the lug is biased by the resilience of the rear section of the plug sleeve into the aperture.

Conveniently, a resilient ornamental cover sleeve may be elastically fitted over the housing sleeve in the region of the snap fastening to cover it both for ornamental purposes and to guard against accidental disconnection.

It is of considerable importance that the leading face of the optic fibre be clean and polished for optimum transmission of light. Therefore, for transport purposes it is normal to provide a cover cap over the rigid jacket and the free unobstructed end face of the fibre. There have been known instances of people attempting to connect the fibre optic connectors without removing such end caps. Therefore, conveniently, an end cap is provided with an enlarged head portion to bring attention to its presence.

The leading end of the rigid jacket may be bevelled to allow for optimal connection between the face of the optic fibre and the member to which it is to be connected. For the same purpose, the end of the optic fibre may be slightly enlarged in lens formation to direct light optimally. Preferably the enlarged end of the optic fibre is formed integrally by molding of the heated optic fibre. The resulting head may be polished. Suitably the enlarged head is hemispherical.

BRIEF DESCRIPTION OF THE DRAWINGS

An embodiment of the invention will now be described by way of example with reference to the drawings, in which:

FIG. 1 is a exploded view of a connector according to the invention;

FIG. 2 is a longitudinal section of FIG. 1;

FIG. 3 is a section of the connector of FIG. 1 in assembled form;

FIG. 4 is a view on the line 4—4 of FIG. 3; and

FIG. 5 shows an enlarged head of the optic fibre.

DETAILED DESCRIPTION OF A PREFERRED EMBODIMENT

A fibre optic plug connector 10 comprises a fibre optic cable having an optic fibre 12 and a flexible protective casing 14. At an end of the cable, the casing 14 is stripped away and replaced by a short length of rigid jacket 16 leaving a leading end face 18 of the fibre available for connection with another fibre or light source. The jacket 16 may be formed of a metal for example brass or stainless steel.

A fixed collar 20 is located about the optic cable at the transition between the protective casing 14 and the rigid jacket 16. The collar comprises a forward cylindrical portion 22 extending the projection of jacket 16. The collar 20 also includes a rearward generally cylindrical portion 24 which is enlarged with respect to the forward portion 22 to cover the leading end of protective casing 14. This rearward portion 24 is also provided with parallel, cut-away portions 26. The rearward collar portion 24 also has radially projecting shoulders 28.

Collar 20 is lodged in a plug sleeve 30 which has an axial passage therethrough and a forward section 32 and a rearward section 34. Rearward plug sect ion 34 may be a C-section sleeve. Plug sleeve 30 is formed of plastics material having at least some resilience. It should be rigid enough to form a generally rigid plug portion but rear section 34 may require some resilience.

The forward section 32 of plug sleeve 30 is shaped as a plug to fit a complementary socket for the connector. The rearward section 34 has an internal diameter to slide on radial shoulders 28 of collar 20. The radial shoulders 28 help to keep the optic fibre 12 properly aligned. Between the forward and rearward sections 32, 34 of plug sleeve 30 a bearing surface 36 is provided for collar 20. Bearing surface 36 is provided with parallel projecting shoulders 38 to mate with cut-away portions 26 of collar 20. As illustrated, there are two cut-away portions 26 corresponding to two internal shoulders 38 generally parallel with each other so as to restrain the collar against rotation within rearward section 34 of plug sleeve 30.

Rearward section 34 while generally shaped as a sleeve, has a cut-away axial portion for ease in assembly of the connector, saving of material and visibility and to increase the distortability of that section.

Rearwardly of the collar 20 a helical spring 40 is arranged about the protective casing 14. The internal diameter of the spring is such that the spring is freely slidable over the protective casing and the out diameter of the spring 40 is such that the spring fits into the rearward section 34 of plug sleeve 30. A forward end 42 of spring 40 bears against a shoulder 44 formed between collar 20 and protective casing 14.

Rearwardly of spring 40 there is a support sleeve 48 about the protective casing 14. The support sleeve 48 is formed of plastic material less flexible than that of the protective casing 14 but with some flexibility. It is intended at least partially to add extra support to the casing in the region of the connector against undue bending or distortion of the cable. Support sleeve 48 which may be formed of polyvinyl chloride is slidable on protective casing 14 and its forward end 50 forms a shoulder abutting rearward end 46 of spring 40. A radially projecting shoulder 52 is provided on a forward end of support sleeve 48.

A housing sleeve 54, which may conveniently be metal, covers the assembled collar 20, plug sleeve 30, spring 40 and forward end of support sleeve 48. The housing sleeve 54 also holds these members together to compress the spring 40 between shoulder 44 of collar 20 and shoulder 50 of support sleeve 48. The housing sleeve 54 has an internally radially projecting shoulder 56 which lodges against shoulder 52 of support sleeve 48. When the connector 10 is assembled with spring 40 compressed housing sleeve 54 is firmly fixed to plug sleeve 30 through a snap connection therewith. The snap connection comprises a lug 56 on rearward section 34 of plug sleeve 30 which locks into an aperture 58 on housing sleeve 54. The relative positions of lug 56 and aperture 58 are such that spring 40 is compressed when the snap fitting is in place. Rearward section 34 of plug sleeve 30 has sufficient resilience to be distorted slightly to fit into and slide within housing sleeve 54 even though lug 56 projects from it. When lug 56 comes into coincidence with aperture 58, the resilient rearward section 34 allows it to snap into place. The resilience is partially achieved due to the utilization of a somewhat resilient plastic material of plug sleeve 30 and is enhanced by the cut-away section of the rearward sleeve 34. Additionally, slots 60 are provided in rearward section 34 to allow for resilient distortion of it.

In assembly, housing sleeve 54 is threaded onto an end of the optic fibre cable. Thereafter, support sleeve 48 and spring 40 are also threaded onto the cable about the protective casing 14. The end of the cable is then stripped off protective casing 14 to expose the optic fibre 12 and collar 20 and jacket 16 are fixedly attached to it.

Plug sleeve 30 is then threaded over collar 20 so that radial shoulders 28 of plug sleeve 30 slide on the inner surface of rearward portion 34 to help align the optic fibre with respect to the plug portion 32. Internal shoulders 38 engage cut-away portions 26 of collar 20 so that plug sleeve 30 and collar 20 are non-rotatable with respect to one another. In this position the collar 20 bears against bearing surface 36 of plug sleeve 30.

The connector is finally locked into its assembled position by sliding housing sleeve 54 forwardly over rearward section 34 of plug sleeve 30. As housing sleeve 54 is slid forwardly it carries with it both spring 40 and support sleeve 48 with radially projecting shoulder 52 of support sleeve 48 bearing against inwardly radially directed shoulder 56 of housing sleeve 54. When housing sleeve 54, support sleeve 48 and spring 40 have moved so far forward that the forward end 42 of spring 40 abuts shoulder 44 of collar 42, then spring 40 starts to compress. At this point lug 58 of rearward section 34 is sliding within housing sleeve 54. Lug 58 slides into housing sleeve 54 so that it is level with aperture 60. Housing sleeve 54 and plug sleeve 30 may be rotated with respect to one another to bring aperture 60 and lug 58 into coincidence. Lug 58 automatically snaps into aperture 60 due to the resilience of rearward section 34 of plug sleeve. The connector is then fully assembled.

For decorative purposes and/or to protect the snap fastening between lug 58 and aperture 60 an elastic sleeve 62 may be expanded and moved into place to cover the snap connection.

To protect the leading end face 18 of optic fibre 12 from damage, a small plastic cap 64 may be fitted over jacket 16 for ease of handling and ease of visibility cap 64 is provided with an enlarged head 66 or circumferential rib. Enlarged head 66 should inhibit any attempt by a user to connect the connector 10 with the plastic cap 64 still in place.

As shown in FIG. 5 the end face 18 of optic fibre 12 may be enlarged to enhance light transmission. The shape of the enlargement may be generally hemispherical as shown in the drawing. This shape may be achieved by healing the projecting end of the optic fibre and molding it to shape. The resulting head should be highly polished for good light transmission.

I claim:

1. A fibre optic plug connector comprising a fibre optic cable comprising:

an optic fibre having a flexible protective casing along its length and a rigid jacket about the circumference of an end portion, an unobstructed end face of the fibre being for connection to a complementary member;

a collar about the fibre optic cable at a transition between said protective casing and said rigid jacket, the rigid jacket projecting forwardly out of the collar;

a plug sleeve to receive the collar therein having an axial passage therethrough and having forward and rearward section, the forward section being formed as a plug to fit a complementary socket, the plug sleeve having an internal shoulder shaped to engage a forward end of the collar in non-rotational relationships such that said rigid jacket projects forwardly from the plug sleeve;

a helical spring about said protective casing rearwardly of the collar and within said rearward section of the plug sleeve;

a support sleeve about said protective casing rearwardly of said spring, said support sleeve having a radially outwardly projecting shoulder about a forward end portion thereof; and a housing sleeve having a forward open end portion to cover the rearward section of the plug sleeve and to cover the forward end portion of the support sleeve, snap fastening means being provided between the housing sleeve and the plug sleeve to fasten them together such that the spring is compressed between the collar and the support sleeve to bias the optic fibre forwardly.

2. A fibre optic plug connector as claimed in claim 1 in which the plug sleeve is resiliently biased within the housing sleeve for engagement of said snap fastening means.

3. A fibre optic plug connector as claimed in claim 2 in which said snap fastening means comprises a lug projecting radially from a rear section of the plug sleeve to engage a socket in the housing sleeve.

4. A fibre optic plug connector as claimed in claim 1 in which the rear section of the plug sleeve comprises a C-section sleeve.

5. A fibre optic plug connector as claimed in claim 4 in which the rear section of the plug sleeve includes at least one closed end longitudinal slot closed at each end.

6. A fibre optic plug connector as claimed in claim 1 in which the optic fibre has an integral molded enlarged head at a distal forward end of said rigid jacket.

7. A fibre optic plug connector as claimed in claim 6 in which the integral molded enlarged head is generally hemispherical.

8. A fibre optic plug connector as claimed in claim 1 having a removable protective end cap for a distal end of the rigid jacket and optic fibre, the end cap having a radially enlarged portion.

* * * * *